United States Patent [19]
Blondeleau et al.

[11] 3,752,007
[45] Aug. 14, 1973

[54] SAFETY COUPLINGS FOR AUTOMOTIVE STEERING COLUMNS

[75] Inventors: Jacques Blondeleau; Marcel Misseri, both of Billancourt, France

[73] Assignees: Régie Nationale des Usines Renault, Billancourt (Hauts de Seine); Automobiles Peugeot, Paris, both of France

[22] Filed: Dec. 13, 1971

[21] Appl. No.: 207,174

[30] Foreign Application Priority Data
Dec. 16, 1970 France .............................. 7045326

[52] U.S. Cl. .................................................. 74/492
[51] Int. Cl. ............................................... B62d 1/18
[58] Field of Search ............................. 74/492, 493

[56] References Cited
UNITED STATES PATENTS
3,486,396  12/1969  Yoshioka et al. ................... 74/492
3,662,616  6/1970  Jouade ................................ 74/492

*Primary Examiner*—Milton Kaufman
*Attorney*—Richard K. Stevens, Davidson C. Miller et al.

[57] ABSTRACT

Safety device for steering column of motor vehicle, which comprises a steering column made of a plurality of elements assembled by means of joints of which one consists of a vibration damping coupling, characterized in that the vibration damping member proper surrounds partially at least one of the two elements of the steering column and that each element comprises torque transmission elements rotatably solid with said vibration damping member.

4 Claims, 7 Drawing Figures

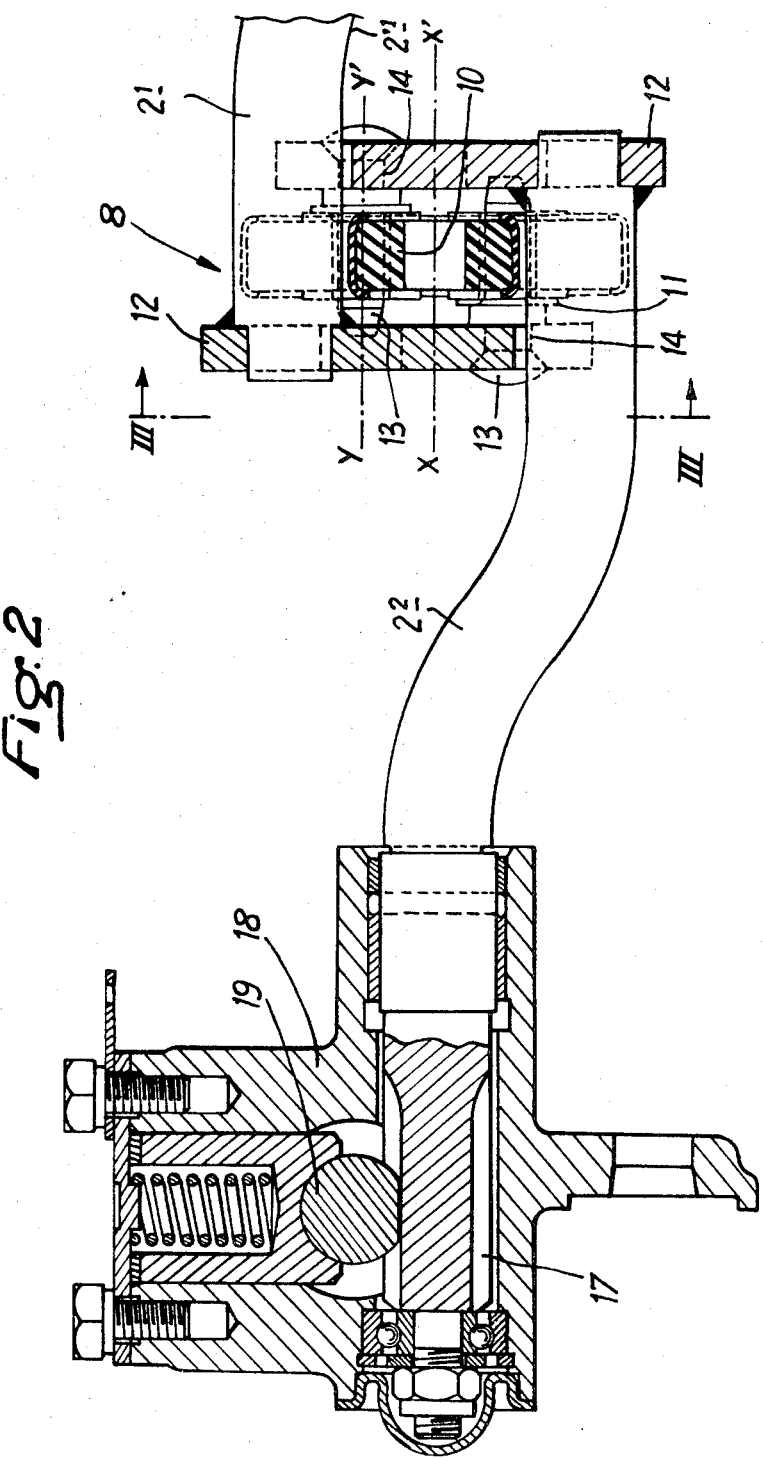

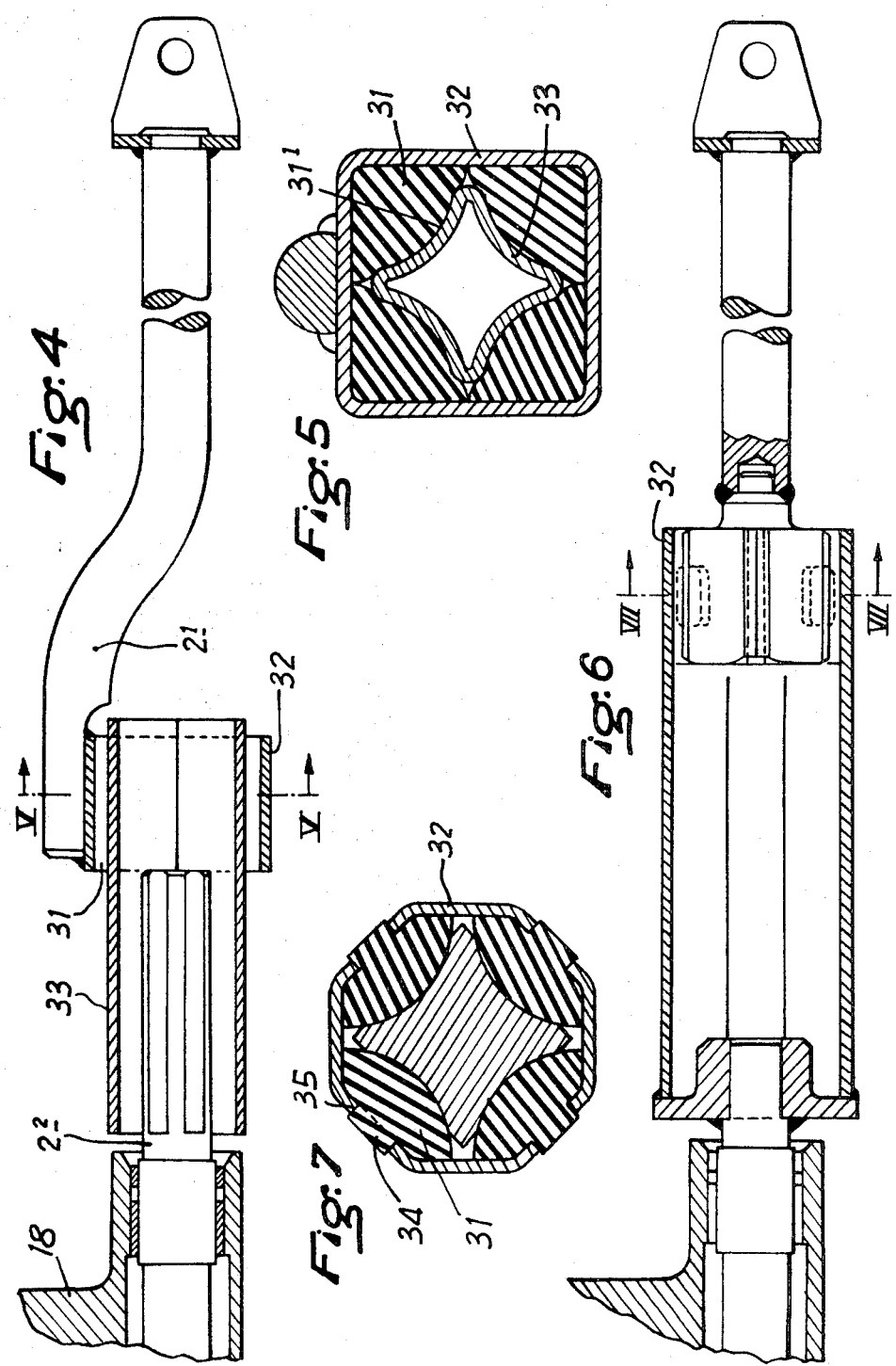

SAFETY COUPLINGS FOR AUTOMOTIVE STEERING COLUMNS

The present invention relates in general to safety steering mechanisms of automotive vehicles, notably of the type comprising a steering column consisting of several aections connected in end-to-end relationship between the steering wheel and the steering gear box.

Steering columns of motor vehicles are already known wherein the column sections are designed for collapsing in case of severe shock at the front of the vehicle or under the pressure exerted by the driver's body thrown forwards during a crash. The safety of operation of these known devices is not sufficient in case the impact stress directed obliquely in relation to the axis of the steering column exerts a thrust against the steering gear box in the very frequent case of crashes other than strictly frontal ones.

With a view to simplify the general structure, another proposition consisted in interposing between the steering wheel and the steering column a deformable member of which the resistance increases gradually during its distorsion; this member is capable of damping out the impact of the driver's chest against the steering column. However, the permissible maximum stroke of the steering wheel is most likely to prove insufficient for efficiently protecting the driver when the latter, in the absence of a safety harness or belt, is thrown forwards in case of crash.

To cope with this inconvenience, safety devices have been contrived with a view to avoid the movements of the passengers towards the rigid elements of the vehicle compartment, by resorting to inflatable bags or bladders.

Thus, in case of front crash or shock, the bag or bladder is inflated automatically and as the chest of the driver or passenger engages this damping element a balance of forces is produced and followed by a gradual deflation of the bag or bladder. To be really efficient this device requires that the distance between the passenger and the protection surface provided by the device should vary only as a function of the movement of the passenger towards this surface. In fact, it is hardly thinkable that a backward movement of the steering column into the passenger compartment could be allowed during the movements of the steering gear box, notably if the steering column has a relatively steep inclination to the longitudinal axis of the vehicle.

To avoid this serious inconvenience, steering columns comprising two adjacent, aligned sections have been proposed. Thus, in case of sudden overload, these sections separate from each other or move in relation to their junction node.

To permit this separation of the steering column from the steering gear proper during lateral and axial efforts leading to a displacement of said steering gear, it is the basic idea of this invention to provide a safety device for the purpose set forth hereinabove, wherein the steering column is connected to the steering box and therefore to the mechanism enclosed therein through a rotary coupling formed with notches permitting the interpenetration of two sections or elements of the steering column during the transmission of the rotational torque exerted on the steering wheel.

It is a further object of this invention to provide a safety device adapted to uncouple the steering column in case of relatively reduced load, so that any increment in the load applied to one of said sections cannot interfere with the other section.

This device, comprising essentially an elastic coupling with a vibration damping member, rotational-torque transmission members operatively connected to said vibration damping member and secured to a pair of elements of the steering column while admitting a common axis of rotation, is characterized in that the vibration damping member surrounds partially at least one of said elements of the steering column, and that each element of said pair comprises in a manner known per se torque transmission means rotatably solid with said vibration damping member.

Two typical forms of embodiment of the safety coupling device for steering columns of vehicles according to this invention will now be described in detail with reference to the diagrammatic drawings attached hereto, wherein :

FIG. 2 is a detailed sectional view of the device of FIG. 1 ;

FIG. 4 is a longitudinal section showing a modified form of embodiment of the device ;

FIG. 5 is a section taken along the line V—V of FIG. 4 ; and

FIGS. 6 and 7 are a longitudinal section and a section taken along the line VII—VII, respectively, of FIG. 6, showing a different form of embodiment of this invention.

Figure 1:
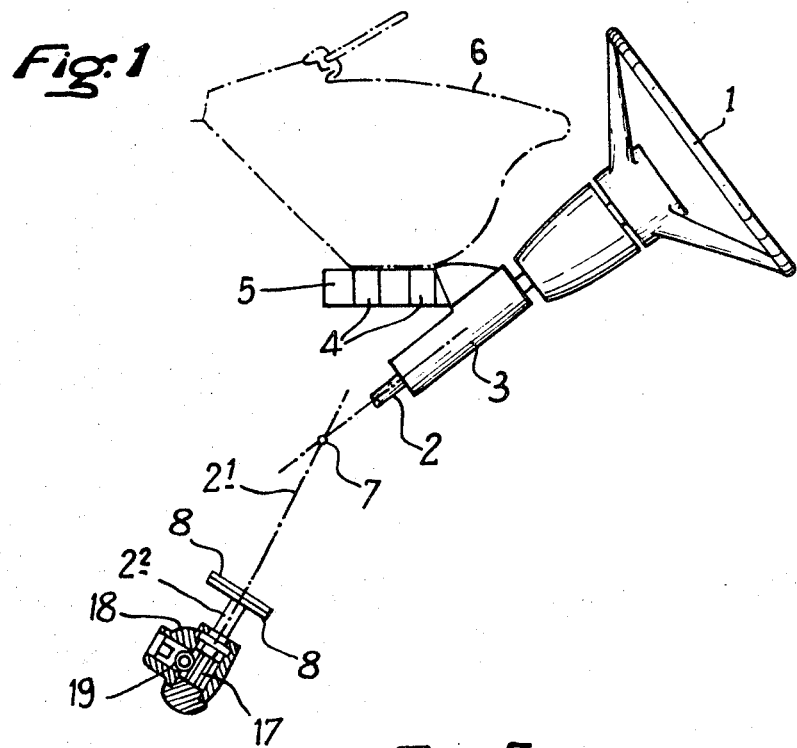
FIG. 1 is a diagrammatic, part-sectional view of a steering column safety device according to this invention, mounted in a vehicle.

Referring to FIG. 1, the steering wheel 1 is rigid with the rear section 2 of the steering column enclosed in a tubular casing or outer column 3. Collars 4 rigid with an arm 5 extending laterally from the tubular casing 3 are provided for rigidly securing this casing to the instrument panel or facia board 6 of the vehicle.

The steering column, in the exemplary form of embodiment illustrated, comprises elements or sections 2, $2_1$, $2_2$. Section 2 is assembled to section $2_2$ through section $2_1$ connected to sections 2 and $2_2$ by means of a transmission joint 7 and an elastic coupling 8, respectively.

This elastic coupling 8 as shown in FIG. 2 comprises a vibration damping rubber socket 10 having an axis of rotation $XX^1$, in which four metal sockets 11 are embedded.

The steering column sections $2_1$ and $2_2$ comprises two cranked elements each rigid with a separate flange 12. Torque transmission members 13 having their axes at $YY'$ parallel to the aforesaid axis $XX'$ engage holes 14 formed in these flanges 12 and also the bores of metal sockets 11.

Figure 3:
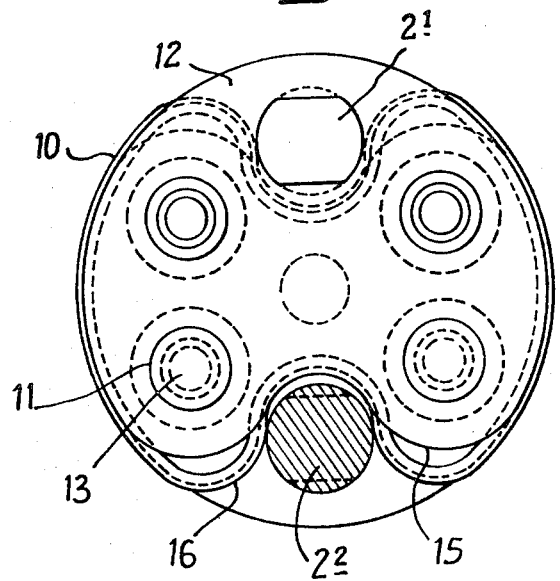
FIG. 3 is a section taken along the line III—III of FIG. 2.

Each flange 12 further comprises a circular aperture 15 partially surrounding the steering column sections $2_1$ and $2_2$. Each aperture 15 registers with a homologue aperture 16 of the vibration damping member 10 (see FIG. 3).

The steering column element $2_2$ is rigid with, or has formed thereon, the rack pinion 17 rotatably mounted in a steering box 18 adapted to guide the movements of translation of the rack 19 driven through said pinion 17 and controlling the steering linkage.

The above-described device operates as follows :

As a consequence of a shock directed against the front of the vehicle, the steering box 18 is moved towards the elastic coupling 8. Due to the backward thrust exerted by the cranked element $2_2$ the flange 12 rigid with element $2_2$ is moved, thus releasing the torque transmission members 13 from the relevant sockets 11.

Under these conditions, it is clear that the steering column element $2_1$ remains stationary during the backward movement of element $2_2$ and that the rotational torque applied to the steering wheel is nevertheless transmitted to said element $2_2$ in case of relatively moderate shock.

It will also be seen that the specific arrangement contemplated affords a gradual separation of sections $2_1$ and $2_2$ from each other if the front shock applied to the vehicle is attended by a substantial shifting of the steering box 18. In this case, the cranked portion $2_1'$ of element $2_1$ exerts a tractive effort on one of flanges 12. This effort permits the retraction of section $2_2$ from the apertures 15 and 16 of the other flange 12 and of the vibration damping member 10. It is thus obvious that under these conditions the transmission of any torque applied to the steering wheel is definitely precluded.

In the modified form of embodiment illustrated in FIGS. 4 and 5, the vibration damping member comprises a plurality of resilient elements 31 rotatably solid with an external socket 32. These elements 31 surround an internal torque transmitting member 33 by engaging same with co-acting surfaces $31^1$ and may be cemented to this torque transmitting member 33.

The torque transmitting member 33 has substantially the shape of a hollow spider in cross section, the hollow portion receiving the section $2_2$ of the steering column which is rigid with the rack pinion 17. The same section $2_2$ is welded to the inner transmission member 33 so as to be rigidly connected thereto for both rotational and translational movements.

In case of backward thrust exerted by the element $2_2$, the internal torque transmission member 33 is moved in relation to elements 31. Since the steering column element $2_1$ remains stationary during this backward movement of the assembly comprising the section $2_2$ and internal transmission member 33; it is clear that the rotational torque impressed to the steering wheel is transmitted, provided that the damping elements 31 remain solid with socket 32.

Of course, the same result could be obtained by modifying the dimensions of the internal transmission member 33 so that it can drive the socket 32 notwithstanding the relative axial movement of these elements 32 and 33.

The relative coupling of these elements 32 and 33 may be obtained either by using a section $2_1$ cranked in its portion adjacent to the damping elements or preventing the movements of translation of the damping elements 31 in relation to said socket 32 by means of studs 34 rigid with each element 31 and fitted in holes 35 formed at the outer periphery of socket 32 as illustrated in FIG. 7.

It would not constitute a departure from the basic principle of this invention to select a polygonal contour for the transmission member 33 and socket 32, the sides of this polygon being either convex or concave, in order to obtain a residual drive after the uncoupling action. These members may advantageously be manufactured from steel sheet blanks or sintered metal pieces.

Besides, various modifications may be brought to the specific forms of embodiment shown and described herein, without departing from the scope of the invention, as will obviously appear to anybody skilled in the art.

What is claimed as new is:

1. A steering column for a motor vehicle adapted to uncouple the steering column from the steering box when lateral or axial forces are applied comprising:
    a pair of cranked elements of a steering column having cranked ends which overlap;
    a flange secured to the end of each of said cranked elements with each flange having an opening to accommodate the other cranked element;
    torque transmission members positioned between the flanges to allow rotational torque transmission between the two cranked elements; and
    a vibration damping member partially surrounding the two cranked elements between the two flanges and surrounding said torque transmission members whereby the pair of cranked elements are uncoupled when lateral or axial forces are applied.

2. A steering column according to claim 1 wherein said vibrational damping member contains bores of metal sockets through which the torque transmission members are inserted.

3. A steering column for a motor vehicle adapted to allow axial movement of an element connected to the steering box without axially moving another element which is adapted to be connected to the steering wheel comprising:
    a first cranked element having a socket attached to the cranked portion of the element;
    a second element with a torque transmission element secured thereto which is positioned within the socket of said first element; and
    vibrational damping members positioned between and rotatably solid with the outer surface of said torque transmission element and the inner surface of said socket to transmit rotatably torque between said two elements whereby axial movement of said second element does not axially move said first element.

4. A steering column for a motor vehicle adapted to allow axial movement of an element connected to the steering box without axially moving another element which is adapted to be connected to the steering wheel comprising:
    a first element having an elongated torque transmitting socket member extending from the end of the element with longitudinally extending openings spaced around the periphery;
    a second element having a torque transmitting member secured to one end and positioned within the extended end of said socket member of said first element so that it is spaced from said first element; and
    vibrational damping members positioned between and rotatably solid with the inner surface of said socket and the external surface of said torque transmitting member and extending through the openings in the periphery of said socket to transmit rotatably torque between said two elements whereby axial movement of said first element does not axially move said second element.

* * * * *